(12) United States Patent
Ashdown et al.

(10) Patent No.: US 11,317,489 B2
(45) Date of Patent: Apr. 26, 2022

(54) TEMPORALLY MODULATED LIGHTING SYSTEM AND METHOD

(71) Applicant: Suntracker Technologies Ltd., Victoria (CA)

(72) Inventors: Ian Edward Ashdown, West Vancouver (CA); Wallace Jay Scott, Victoria (CA)

(*) Notice: Subject to any disclaimer, the term of this patent is extended or adjusted under 35 U.S.C. 154(b) by 0 days.

(21) Appl. No.: 17/478,088

(22) Filed: Sep. 17, 2021

(65) Prior Publication Data

US 2022/0007479 A1 Jan. 6, 2022

Related U.S. Application Data

(63) Continuation of application No. 16/926,677, filed on Jul. 11, 2020, now Pat. No. 11,129,253, which is a continuation-in-part of application No. 15/491,166, filed on Apr. 19, 2017, now abandoned.

(60) Provisional application No. 62/324,404, filed on Apr. 19, 2016.

(51) Int. Cl.
*H05B 45/335* (2020.01)
*A01G 7/04* (2006.01)
*F21K 9/64* (2016.01)
*F21K 9/66* (2016.01)
*F21Y 115/10* (2016.01)

(52) U.S. Cl.
CPC ........... *H05B 45/335* (2020.01); *A01G 7/045* (2013.01); *F21K 9/64* (2016.08); *F21K 9/66* (2016.08); *F21Y 2115/10* (2016.08)

(58) Field of Classification Search
CPC ...... Y10S 362/805; A01G 7/045; A01G 9/249
See application file for complete search history.

(56) References Cited

U.S. PATENT DOCUMENTS

| | | | | |
|---|---|---|---|---|
| 2003/0214812 | A1* | 11/2003 | Bourdelais | G02B 5/0247 362/330 |
| 2005/0084229 | A1* | 4/2005 | Babbitt | G02B 6/0003 385/146 |
| 2006/0002110 | A1* | 1/2006 | Dowling | H05B 47/155 362/249.05 |
| 2012/0113672 | A1* | 5/2012 | Dubrow | G02B 6/0061 362/602 |
| 2015/0223402 | A1* | 8/2015 | Krijn | A01G 7/045 362/231 |
| 2015/0360606 | A1* | 12/2015 | Thompson | B60Q 3/54 362/490 |

* cited by examiner

*Primary Examiner* — William J Carter

(57) ABSTRACT

Electric light sources typically exhibit temporal variations in luminous flux output, commonly referred to as "flicker." Flicker, or temporal modulation, is known to influence the growth, health and behavior patterns of humans, and is also linked to growth, health and behavior patterns throughout the growth cycle of plants and animals. Control of peak radiant flux emitted by a light source to temporally modulate a light source will allow for the control of plants and animals for sustainable farming including but not limited to horticultural, agricultural, or aquacultural endeavors. The light source allows the transmission of daylight, which is combined with the flicker.

19 Claims, 3 Drawing Sheets

Fig. 11. Temporal Contrast Sensitivity Function (TSF) for various adapting fields. Kelly's data from Hart Jr., W. M., The temporal responsiveness of vision. In: Moses, R. A. and Hart, W. M. (ed) Adler's Physiology of the eye. Clinical Application. St. Louis: The C. V. Mosby Company, 1987.

TEMPORALLY MODULATED LIGHTING SYSTEM AND METHOD

CROSS-REFERENCE TO RELATED APPLICATIONS

This application is a continuation of application Ser. No. 16/926,677 filed on 11 Jul. 2020, which is a continuation-in-part of application Ser. No. 15/491,166 filed on 19 Apr. 2017 and claims benefit of U.S. provisional Ser. No. 62/324,404 filed 19 Apr. 2016, both of which are incorporated by reference herein in their entireties.

TECHNICAL FIELD

The subject matter of the present invention relates to the field of biological lighting systems and more particularly, is concerned with the beneficial aspects of electric light source flicker for plants and animals for sustainable farming, including but not limited to horticultural, agricultural, and aquacultural endeavors.

BACKGROUND

Electric light sources powered by alternating current power sources typically exhibit temporal variations in luminous flux output, commonly referred to as "flicker." Depending on the alternating current frequency, the ratio of maximum to minimum luminous flux output, and the modulation waveform, flicker may be perceived as being a moderately to severely annoying visual artifact that needs to be alleviated or eliminated.

Vision research to date, however, has mostly focused on the human aspects of visual flicker. Light sources with rapid temporal variations do not occur in nature, and so both animals and plants may exhibit physiological and psychological responses to flickering electric light sources that may be detrimental or beneficial.

Animal husbandry and horticulture in particular are two fields where such physiological and psychological responses may impact the health and wellbeing of the animals and plants, and thereby engender economic benefits and risks. The present invention therefore seeks to address these issues with a system and method for controlling flicker.

SUMMARY

Disclosed herein is a method for temporally modulating a light source for plants wherein the peak radiant flux emitted by a light source can be temporally modulated according to a plant's photopigments and cellular mechanisms to control the response by the plant to electric light source flicker.

Also disclosed herein is a system for temporally modulating a light source for plants wherein: at least one response variable is monitored and the resultant signal incorporated in a closed loop feedback system; and the parameters of the temporally modulated lighting system adjusted.

Further disclosed is a system for optimizing health of a plant comprising: a glazing unit having: an outer pane; an inner pane parallel to and spaced apart from the outer pane; an array of light-emitting elements (LEEs) mounted on an inner side of the outer pane; and transparent electrical conductors adhered to the inner side of the outer pane and connected to the LEEs; a sensor that detects a health parameter of the plant; and a controller connected via the transparent electrical conductors to the LEEs, wherein the controller: controls the LEEs to provide flicker that has a peak radiant flux, an average radiant flux, a duty factor and a pulse frequency, wherein the plant is exposed to the flicker; incorporates a signal from the sensor into a closed loop feedback system; and adjusts, based on the detected health parameter: the peak radiant flux and the duty factor, without adjusting the pulse frequency and the average radiant flux; or the pulse frequency, without adjusting the peak radiant flux, the duty factor and the average radiant flux; wherein said adjustment maintains the health parameter of the plant within predetermined limits.

A method for optimizing health of a plant comprising: providing the plant; exposing the plant to flicker from a glazing unit having: an outer pane; an inner pane parallel to and spaced apart from the outer pane; an array of light-emitting elements (LEEs) mounted on an inner side of the outer pane; and transparent electrical conductors adhered to the inner side of the outer pane and connected to the LEEs; wherein the flicker has a peak radiant flux, an average radiant flux, a duty factor and a pulse frequency, wherein the plant is exposed to the flicker; detecting a health parameter of the plant; and adjusting, based on the detected health parameter: the peak radiant flux and the duty factor, without adjusting the pulse frequency and the average radiant flux; or the pulse frequency, without adjusting the peak radiant flux, the duty factor and the average radiant flux; wherein said adjustment maintains the health parameter of the plant within predetermined limits.

DETAILED DESCRIPTION

Figure 1:
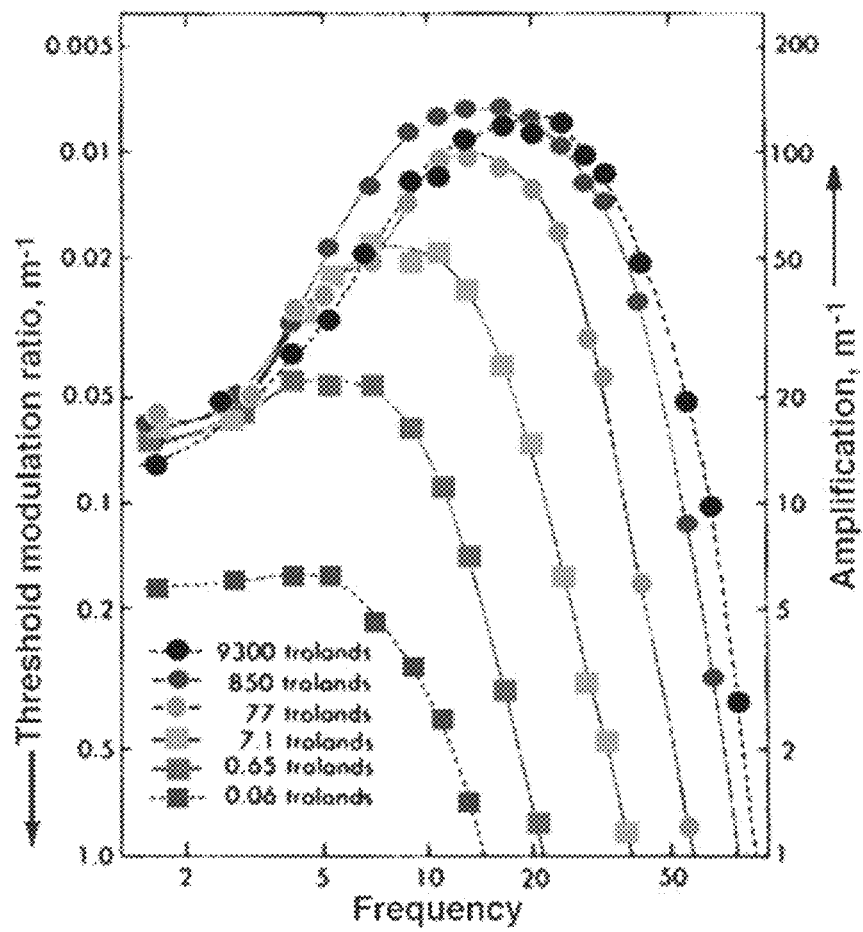
FIG. 1 shows the prior art measured temporal contrast sensitivity function of the human visual system.

The present invention is herein described more fully with reference to the accompanying drawings, in which embodiments of the invention are shown. This invention may, however, be embodied in many different forms, and should not be construed as limited to the embodiments described herein. Rather, these embodiments are provided so that this disclosure will be thorough and complete, and will fully convey the scope of the invention to those skilled in the art.

For the purposes of this application, sustainable farming is the production of food, fiber, or other plant or animal products using techniques that aim to protect the environment, public health, human communities, and animal welfare. Sustainable farming includes but is not limited to horticultural, agricultural, and aquacultural endeavors, including animal husbandry. Any reference to sustainable farming includes one or more, or collectively all, of these endeavors.

The perception of electric light flicker by the human visual system has been studied for more than a century (e.g., Greene 2013). It is widely known that human sensitivity to flicker increases with increasing frequency from one or two Hertz up to approximately 20 to 30 Hertz, depending on the level retinal illuminance, then decreases rapidly for higher frequencies. It is also known that in humans peripheral vision is more sensitive than central vision to flicker.

The "critical fusion frequency" (CFF) is defined as the frequency at which a flashing light source is perceived as a steady rather than an intermittent visual stimulus. This frequency varies with stimulus size, shape, retinal location, adaptation luminance, and modulation depth, but rarely exceeds 60 Hertz, even with a large visual area with 100 percent modulation, seen with a high adaptation luminance.

Flicker above the CFF can be indirectly perceived as blur in the case of high-speed motion, either with perceived objects or rapid eye movement. Stroboscopes in particular take advantage of this psychophysiological phenomenon to render quickly rotating objects as appearing to be static or slowly rotating. Bullough et al. (2013) have shown that the stroboscopic effects of light source flicker are detectable for frequencies as high as one kilohertz.

Even when not visually noticeable, flicker has been implicated in adverse health effects, including headaches, fatigue, blurred vision, eyestrain, migraines, reduced visual task performance, as well as increases in autistic behaviors in children and neurological problems, including epileptic seizures.

With the introduction of semiconductor light-emitting diodes for general lighting applications, the effects of visual flicker on both perception and health and wellbeing has recently become of increased concern to lighting designers (e.g., IEEE 2015, Perrin et al. 2016).

Compared to human perception of visual flicker, less research has been conducted on the perception of flicker by animals (e.g., Boström et al. 2016, Healy et al. 2013, Inger et al. 2014, Lisney et al. 2012).

The animal research has focused on measuring the CFF of various species (e.g., Inger et al. 2014), but there does not appear to be any research on the long-term psychological and physiological impacts of flicker on domestic animals kept under constant electric lighting, even though it is acknowledged as a possibility by, for example, Lisney et al. (2012) in relation to fluorescent lighting.

As for plants, Lefsrud and Kopsall (2006) consider only time periods of hours to minutes for on-off cycles of horticultural lighting.

For animals, sensitivity to light is mediated by light-sensitive proteins called "opsins." More than one thousand opsins have been identified to date, and occur in not only animals, but also archaea, bacteria, fungi, and certain algae (Terakita 2005). In humans, at least five opsins—rhodopsin, long-, medium-, and short-wave opsins, melanopsin, and neuropsin—are responsible for both visual and non-visual light and ultraviolet radiation sensitivity. A complex series of photochemical reactions and neural responses mediate our psychophysiological responses to varying light conditions, with response times ranging from picoseconds to minutes. While there are many different opsins present in the light-sensitive organs of other animal species, they all perform similar functions.

For plants, various photopigments are sensitive to light, including chlorophyll A and B (responsible for photosynthesis), phytochrome (responsible for plant photomorphogenesis), cryptochromes, and many different carotenoids, including xanthophylls and carotenes, that both assist in photosynthesis and protect chlorophyll from damage by ultraviolet radiation and blue light.

Phytochrome in particular has two isoforms, designated $P_r$ and $P_{fr}$, that function as a photosensitive switch when alternately to red (·625 nm) and far red (~730 nm) electromagnetic radiation. This switch regulates a wide variety of physiological functions in plants, including seed germination, shoot growth, flowering, leaf expansion and abscission, and bud dormancy. Borthwick et al. (1952) demonstrated that light pulses as short as one minute are sufficient to disrupt these functions, thereby influencing plant growth. There are at least 600 known carotenoids, and it is not known whether any of them similarly function as photosensitive switches. It is also not known whether there is an upper limit to the exposure frequency for phytochrome in vivo, and the effect this may have on plant development. Effects may range from obvious changes in plant morphology to temporal changes in plant development and the production of plant biomass, nutrients, aromatics, or desirable pharmaceutical compounds.

Plants have also evolved various strategies for dissipating the excess energy received from sunlight. Müller et al. (2001), for example, discuss non-photochemical mechanisms whereby chlorophyll molecules dissipate excess excitation energy as heat.

Plant photopigments and cellular mechanisms will respond in various ways to electric light source flicker, with modulation frequencies potentially ranging from tens of seconds to megahertz. As one example, a plant species irradiated with electromagnetic radiation with a modulation frequency of one to ten kilohertz and a small pulse width duty factor may respond differently over its growth cycle compared to the same species irradiated with constant radiation, even though the irradiance and spectral power distribution may be the same.

Plant biologists and horticulturalists have observed that different plant species respond differently to the same lighting conditions. Given this, determining the responses of the many different plant species to temporally modulated electromagnetic radiation may require additional experimentation. Nevertheless, the basic principles of a novel lighting system can be disclosed that take advantage of these responses.

In one embodiment, the peak radiant flux emitted by a light source can be temporally modulated. For example, the peak drive current delivered to a semiconductor light-emitting diode may be controlled by analog circuitry. Alternatively, the drive current may be digitally modulated at a high frequency that does not influence the plant response.

The average radiant flux emitted by a light source can additionally be temporally modulated. For example, the duty cycle of a pulse width modulation current delivered to a semiconductor light-emitting diode may be controlled by digital circuitry. With 100 percent duty cycle, the light source will deliver constant irradiance for the plant at a level that it can tolerate. Conversely, with say 20 percent duty cycle and 5 times the peak level, the light source will deliver the same average irradiance, but with peak irradiance such that the plant is forced to dissipate the excess energy received during each pulse.

The waveform of the temporally modulated flux may be an on-off square wave with a variable duty factor. A more complex waveform may also be employed.

Figure 2:
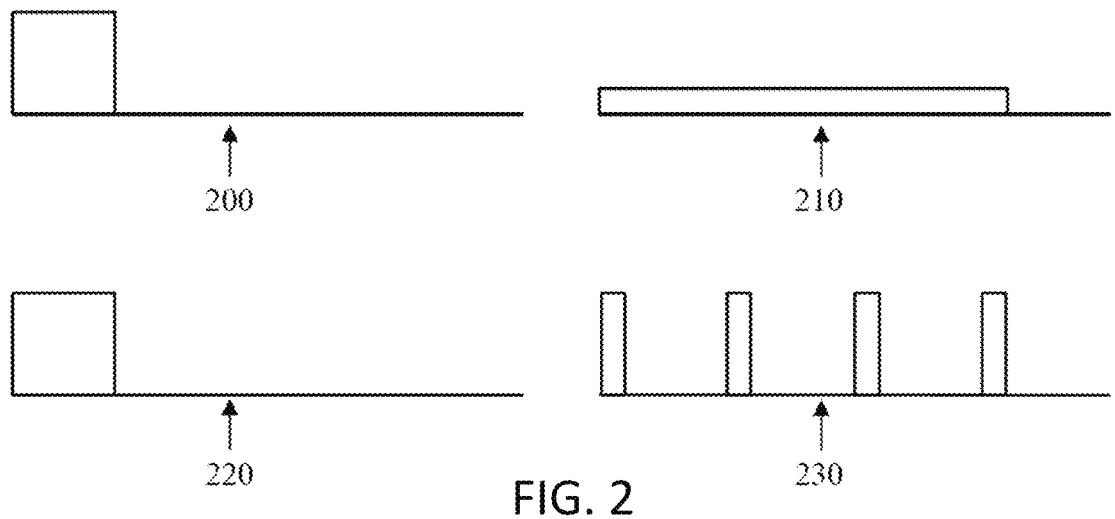
FIG. 2 shows four example pulse width modulation waveforms that exhibit different duty cycles but result in constant average radiant flux.

FIG. 2 shows four examples of pulse width modulation (PWM) waveforms that exhibit different duty cycles but result in constant average radiant flux.

In one embodiment, the peak radiant flux can be controlled by an analog constant current driver while the average radiant flux is controlled by an additional digital constant current driver. As an example, 200 shows a pulse width modulated (PWM) waveform with a 20 percent duty factor, while 210 shows a PWM waveform with 80 percent duty factor and a peak output that is 25 percent of that shown in 200. Consequently, both waveforms result in the same average radiant flux.

In another embodiment, the peak radiant flux can be controlled by a high-frequency digital constant current driver while the average radiant flux is controlled by an additional digital constant current driver with a lower frequency signal that is superimposed on the high frequency signal. (As an example, 220 shows a pulse width modulated (PWM) waveform with a 20 percent duty factor, while 230 shows a PWM waveform with four evenly-spaced pulses, each exhibiting 5 percent duty factors and the same peak output as that shown in 220. Consequently, both waveforms again result in the same average radiant flux.)

In a preferred embodiment, only selected regions of the electromagnetic radiation spectrum are temporally modulated. Many plant photopigments have narrow spectral responsivity bandwidths, and so it is advantageous to provide temporally modulated irradiance within these spectral bands while otherwise providing constant irradiance across the biologically active spectrum. Similarly, it is advantageous to modulate different bands with different frequencies, and with different peak and average radiant flux.

Changes in modulation over the growth cycle of a plant species may also be implemented to take into account the changes in plants physiology during the plant growth cycle, including plant photopigments. This results in a need to modify the regions of the electromagnetic radiation spectrum as a plant matures. Plant maturity may include the stages from germination to seedling, to young plant, to mature plant. Similar changes in modulation as animals or fish mature may also be implemented to take into account the changes in animal physiology and behavior during growth.

In another embodiment the temporal modulation frequency or frequencies, peak and average radiant fluxes, and spectral power distribution are varied on a diurnal day-night basis (which is not necessarily 24 hours in length), and over the growth cycle of the species being grown under the lighting conditions.

In another embodiment the temporally modulated electric lighting is combined with constant electric lighting.

The temporally modulated electric lighting may be combined with natural daylight.

The temporally modulated electric lighting may be combined with natural daylight and supplemental electric lighting.

The temporally modulated electric lighting may be combined with natural daylight or natural daylight and supplemental electric lighting through a daylight harvesting system. A daylight harvesting system may include a combination of hardware and software used to maximize the effectiveness and/or efficiency of electric lighting in conjunction with natural daylight.

Temporally modulated lighting may be provided by variable transmittance windows, such as for example electrochromic windows or a system of automated blinds and louvers.

In one embodiment one or more response variables is monitored and the resultant signal incorporated in a closed loop feedback system, wherein the parameters of the temporally modulated lighting system may be adjusted to optimize system performance. As an example, the chlorophyll fluorescence of a plant may be monitored as an indication of plant health, and the pulse width modulation frequency or duty cycle adjusted using a proportional-integral-derivative (PID) control algorithm to maintain plant health.

Figure 3:
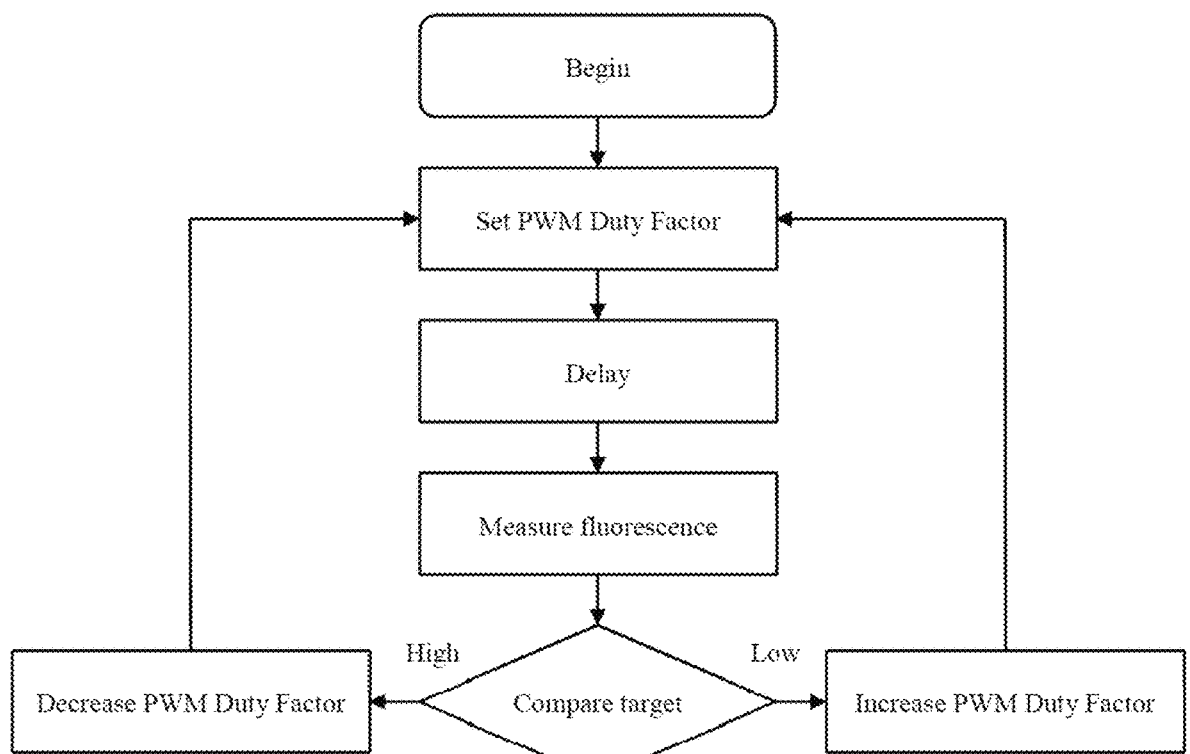
FIG. 3 shows a flowchart for a closed loop feedback system capable of maintaining optimal plant growth.

As an example, FIG. 3 shows a flowchart for a closed loop feedback system wherein the PWM duty factor is periodically adjusted such that the measured chlorophyll fluorescence of a plant is maintained within desired limits during plant growth.

One or more response variables may be monitored and the resultant signal incorporated in a fuzzy logic or neural network control system with artificial intelligence capabilities that can learn optimum combinations of system parameter settings for different plant species and predict optimal settings based on observed temporal trends in system performance.

Figure 4:
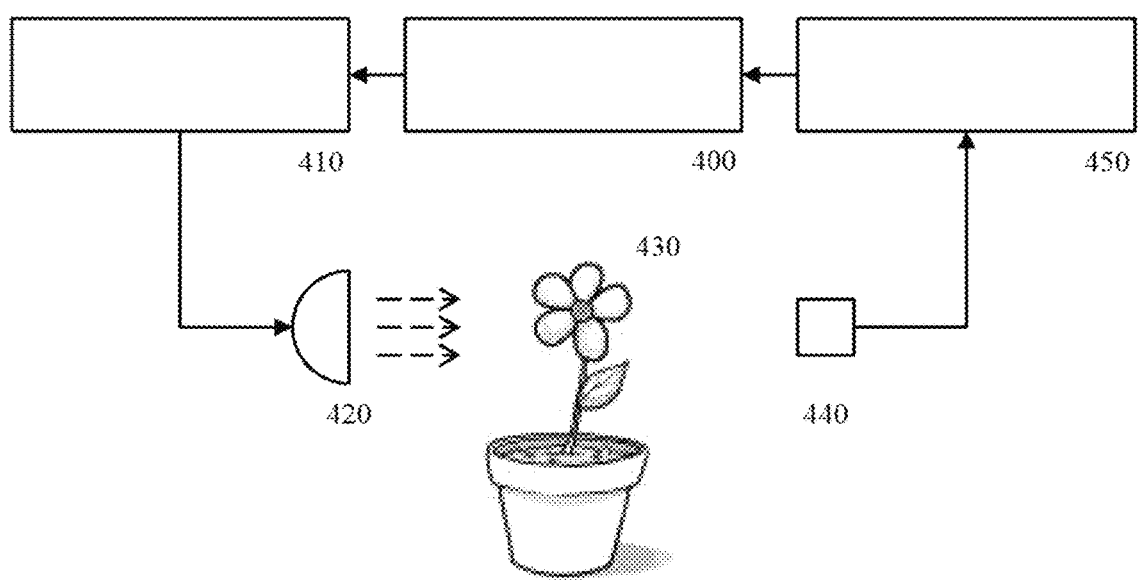
FIG. 4 shows a trainable neural network controller that learns optimal settings for temporally modulated light sources.

As an example, FIG. 4 shows a trainable neural network controller 400 that sets the peak amplitude and duty cycle of light source controller 410, which provides temporally modulated drive current to light source 420. Light source 420 irradiates plant 430 with biologically active radiation, causing the plant to grow. Sensor 440 detects a plant growth and health parameter, such as for example chlorophyll fluorescence or fruit color. Sensor controller 450 periodically samples the signal from sensor 440 and provides the data as input to neural network controller 400.

Figure 5:
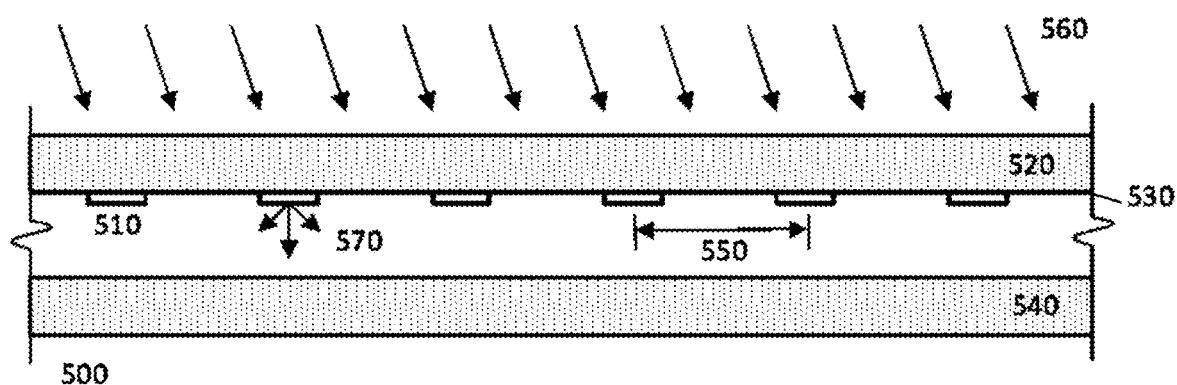
FIG. 5 shows a section of double-paned glazing with light-emitting elements and an optical diffuser.

The windows that are used for providing temporally modulated lighting to the plants may also include sources of light for producing the flicker. Another such embodiment is shown in FIG. 5, wherein an assembly 500, which is a glazing unit, includes a spaced array of temporally-modulated light-emitting elements (LEEs) 510 that are mechanically coupled to a first transparent substrate 520 and electrically connected to transparent conductors 530, and wherein said first transparent substrate 520 is proximate and parallel to a second transparent substrate 540. The first transparent substrate 520 may be referred to as the outer pane of the assembly 500, and the second transparent substrate 540 may be referred to as the inner pane. In some embodiments, the conductors 530 are not transparent, as they can be made narrow enough not to block significant daylight passing through while still carrying adequate current to sufficiently illuminate the LEEs. In some embodiments, the conductors may be translucent, or substantially transparent so that their effect on the daylight passing through the glazing unit is negligible.

While the embodiments herein reference plants specifically, the same techniques can be applied to animals for sustainable farming, including but not limited to horticultural, agricultural, and aquacultural endeavors. The use of flicker to stress and destress animals and fish may also have a beneficial or negative impact in terms of sustainable farming (example, while human awareness of flicker is around 100 Hz, chickens will see flicker well beyond humans up to around 300 Hz, so that they are essentially living in a strobe light under HPS (high pressure sodium) lamps. Fish and other animals are be similarly affected by flicker.

Additionally, the same techniques can be applied as a health benefit for humans. The control of flicker to reduce stress and improve overall health in humans can be monitored and employed in different environments, including for example office buildings, industrial complexes, commercial areas, and residential areas.

In an embodiment, said assembly 500 is a double-pane glazing unit, wherein the transparent substrates 520, 540 are fabricated from, for example, soda-lime glass, borosilicate glass, or polymethyl methacrylate (PMMA), and the space between them is evacuated or filled with a thermally insulating gas such as argon. The separation 550 between the LEEs is chosen such that the maximum amount of daylight 560 is transmitted by the assembly 500 while simultaneously maximizing the amount of light 570 that can be emitted by the LEEs commensurate with the need to dissipate thermally-conductive heat through substrate 520. Daylight, or other ambient light, is incident on the outside of the outer pane of the assembly 500 and passes through the assembly 500 to emerge from the inner pane. The light 570 that is emitted from the LEEs 510 also emerges from the assembly 500 from the inner pane, so that the daylight 560 and light 570 from the LEEs are combined to illuminate the plants.

In another embodiment, the glazing unit may include more than two panes. In addition, fluid may be included between the panes. Such fluid may include gas, such as air or argon for thermal insulation, laminar water flow or even index-matching oil such as mineral spirits to improve thermal heat transfer. The flow may be achieved, for example, by including a pump in the assembly 500. The fluid may also have properties that affect the light, including ambient (external) and supplemental (internal) light, including the transmissive, diffusion, and reflective properties of the fluid. The fluid or fluids may be tuned to increase the effectiveness of ambient and supplemental lighting.

In an embodiment, transparent substrate 540 is an optical diffuser comprised of, for example, a transparent substrate with an etched (or otherwise textured) surface or a bulk material with embedded diffusing particles. In other embodiments, the surface of the transparent substrate 540 may be textured by embossing a pattern thereon. In some embodiments, the textured surface may be provided on PMMA by the application of holographic diffuser patterns.

In a similar embodiment, transparent substrate 540 is an optical diffuser comprised of, for example, a transparent substrate with an etched surface or a bulk material with embedded diffusing particles, wherein said particles are luminophores that are excited by photons within a first range of wavelengths (the "excitation" spectrum) and re-emit photons within a second range of wavelengths (the "emission" spectrum). Such an embodiment is useful, for example, in greenhouse glazing wherein the luminophores absorb blue light from incident daylight or light emitted by quasimonochromatic LEEs (such as blue light-emitting diodes) and convert it into red light that is more readily absorbed by plants for photosynthesis. When the luminophores are fluorophores, phosphors or quantum dots with suitably short decay times, the temporal flickering of the LEEs will be preserved.

Figure 6:
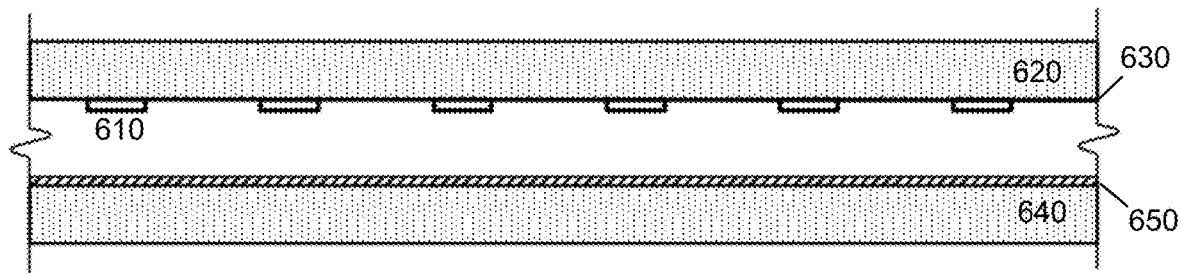
FIG. 6 shows a section of double-paned glazing with light-emitting elements and a holographic diffuser.

Another embodiment is shown in FIG. 6, wherein an assembly 600 is similarly comprised of a spaced array of temporally-modulated light-emitting elements (LEEs) 610 that are mechanically coupled to a first transparent substrate 620 and electrically connected to transparent conductors 630, wherein said first transparent substrate 620 is proximate and parallel to a second transparent substrate 640, and where a holographic diffuser 650 is optically coupled to transparent substrate 640.

An advantage of the holographic diffuser 650 is that, as disclosed by Tedesco (U.S. Pat. No. 5,861,990), it both diffuses and concentrates incident light. Thus, for example, a greenhouse that is aligned on an approximate east-west axis may be provided with holographic diffusers on its roof panels such that more daylight is directed into the greenhouse when the incident direct sunlight is at large acute angles such as occur in the early morning and late afternoon. Holographic diffusers may be engineered to exhibit circular, elliptical or linear diffusion characteristics, as disclosed by, for example, Santoro in U.S. Pat. No. 7,660,039. The degree of diffusion (both eccentricity and full-width half-maximum angle) and diffuser orientation (for elliptical and linear holographic diffusers) may therefore be selected based on greenhouse alignment, roof style, and historical weather data to determine the expected availability of direct sunlight per month.

The term "light-emitting element" (or "LEE") is defined as any device that emits electromagnetic radiation at a wavelength or within a wavelength regime of interest, for example, a visible, infrared or ultraviolet regime, when activated by applying a potential difference across the device and/or passing a current through the device. Examples of LEEs include solid-state, organic, polymer, phosphor-coated or high-flux LEDs, laser diodes, and other similar devices as would be readily understood. The emitted radiation of a LEE may be visible, such as red, blue, or green, or invisible, such as infrared or ultraviolet. A LEE may produce radiation of a spread of wavelengths. A LEE may include a phosphorescent or fluorescent material for converting a portion of its emissions from one set of wavelengths to another. A LEE may include multiple LEEs, each emitting essentially the same or different wavelengths. A LEE may also feature an optic that redirects light emitted by the semiconductor die in preferred directions. The optic may be a refractive or diffractive optical element that is molded or embossed onto the die or its supporting (typically transparent) substrate. A lateral dimension of the optic may be, e.g., less than or approximately equal to the spacing between LEEs (within an array of LEEs), for example between approximately 1 mm and approximately 10 mm.

A LEE may be of any size. In some embodiments, a LEE has one lateral dimension less than 500 µm. Exemplary sizes of a LEE may include about 250 µm by about 600 µm, about 250 µm by about 400 µm, about 250 µm by about 300 µm, or about 225 µm by about 175 µm. In some embodiments, a LEE includes or consists essentially of a small LED die, also referred to as a "microLED." A microLED generally has one lateral dimension less than about 300 µm. In some embodiments, the LEE has one lateral dimension less than about 200 µm or even less than about 100 µm. For example, a microLED may have a size of about 225 µm by about 175 µm or about 150 µm by about 100 µm or about 150 µm by about 50 µm. In some embodiments, the surface area of the top surface of a microLED is less than 50,000 µm$^2$ or less than 10,000 µm$^2$.

While LEEs have been used as examples of elements that may be used in embodiments of the present invention, other semiconductor die may also be used instead of or in addition to such devices. For example, photovoltaic cells (for example single junction or multijunction cells), transistors, photodiodes, laser diodes, resistors, capacitors, non-emitting diodes, and/or sensors may be utilized. As used herein, "phosphor" refers to any material that shifts the wavelength of light irradiating it and/or that is luminescent, fluorescent, and/or phosphorescent. Phosphors may be in the form of powders or particles and in such case may be mixed in binders, e.g., silicone. As used herein, phosphor may refer to the powder or particles or to the powder or particles plus binder.

Any one or more response variables monitored, and any input data, may be collected as data and stored in a database locally, transmitted, including wireless transmission, to an offsite database, or stored or transmitted in a means that will allow import into a database. The availability and accessibility of this data may allow for further refinements within the system, and additional study of the results.

While this disclosure discusses temporally modulated lighting in terms of plant growth in greenhouses and vertical farms, the invention may also be applied to animal husbandry applications, included but not limited to aviaries, poultry farms, aquaculture farms, fresh and saltwater aquaria, and insects raised for protein (food), pest control, and pharmaceutical purposes.

We claim:

1. A system for irradiating a plant comprising:
a glazing unit with light-emitting elements (LEEs);
a current driver that provides current to the glazing unit;
a sensor that detects a health parameter of the plant; and
a controller connected via the current driver to the LEEs, wherein the controller:
controls the LEEs to provide flicker that has a duty factor, a pulse frequency, a peak radiant flux and an average radiant flux, wherein the plant is exposed to the flicker;
provides a modulated first frequency signal for controlling the peak radiant flux; and
provides a modulated second frequency signal for controlling the average radiant flux;
wherein the second frequency is lower than the first frequency, the first and second frequency signals are superimposed, and the current is modulated with the superimposed first and second frequency signals;
and wherein the controller adjusts, based on the detected health parameter:
the peak radiant flux and the duty factor, without adjusting the pulse frequency and the average radiant flux; or
the pulse frequency, without adjusting the peak radiant flux, the duty factor and the average radiant flux.

2. The system of claim 1 wherein:
the glazing unit has an outer pane and an inner pane parallel to and spaced apart from the outer pane;
the LEEs are mounted on an inner side of the outer pane; and
the inner pane transmits light that has passed through the outer pane and light that is emitted from the LEEs.

3. The system of claim 2, comprising electrical conductors adhered to the inner side of the outer pane and connected to the LEEs, wherein the controller is connected to the LEEs via the electrical conductors.

4. The system of claim 3 wherein the electrical conductors are substantially transparent.

5. The system of claim 2 wherein:
the outer pane and the inner pane are soda-lime glass, borosilicate glass or polymethyl methacrylate; and
a space between the outer pane and the inner pane is filled with air, argon or liquid.

6. The system of claim 5, wherein the liquid is water, mineral spirits, flowing water or flowing mineral spirits.

7. The system of claim 2, wherein the inner pane is an optical diffuser.

8. The system of claim 7, wherein the optical diffuser comprises:
a transparent substrate with a textured surface;
a material with embedded diffusing particles; or
a material with embedded luminophores.

9. The system of claim 8, wherein the luminophores are fluorophores, phosphors or quantum dots that have a decay time shorter than an off-cycle of the flicker.

10. The system of claim 2, further comprising a holographic diffuser on an inner surface of the inner pane.

11. The system of claim 1, wherein the LEEs are micro light emitting diodes.

12. The system of claim 1, wherein the controller incorporates a signal from the sensor into a closed loop feedback system and said adjustment maintains the health parameter of the plant within predetermined limits.

13. The system of claim 1, wherein the current driver comprises:
a first current driver via which the peak radiant flux is controlled; and
a second current driver via which the average radiant flux is controlled.

14. A method for irradiating a plant comprising:
exposing the plant to flicker from a glazing unit with light-emitting elements (LEEs), wherein the flicker has a duty factor, a pulse frequency, a peak radiant flux and an average radiant flux;
modulating a current, which is provided to the LEEs, by a first frequency signal for controlling the peak radiant flux and by a second frequency signal for controlling the average radiant flux, wherein the second frequency is lower than the first frequency and the first and second frequency signals are superimposed;
detecting, using a sensor, a health parameter of the plant; and
adjusting, based on the detected health parameter:
the peak radiant flux and the duty factor, without adjusting the pulse frequency and the average radiant flux; or
the pulse frequency, without adjusting the peak radiant flux, the duty factor and the average radiant flux.

15. The method of claim 14,
wherein said adjustment maintains the health parameter of the plant within predetermined limits.

16. The method of claim 14 comprising exposing the plant to further flicker having a different spectrum to a spectrum of the flicker, wherein the further flicker is modulated with different frequencies than the first and second frequencies.

17. The method of claim 14 comprising exposing the plant to a combination of the flicker and constant electric lighting.

18. The method of claim 14 comprising exposing the plant to a combination of the flicker and natural daylight.

19. The method of claim 14 wherein the adjusting step uses fuzzy logic, artificial intelligence or a neural network control system.

* * * * *